(12) United States Patent
Tsuji et al.

(10) Patent No.: US 7,999,792 B2
(45) Date of Patent: Aug. 16, 2011

(54) ELECTRONIC APPARATUS

(75) Inventors: Hiroyuki Tsuji, Ome (JP); Kazuhito Oonuma, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 12/395,035

(22) Filed: Feb. 27, 2009

(65) Prior Publication Data

US 2009/0322683 A1    Dec. 31, 2009

(30) Foreign Application Priority Data

Jun. 30, 2008    (JP) .................................. 2008-171203

(51) Int. Cl.
*G06F 3/02* (2006.01)
(52) U.S. Cl. ...................... 345/168; 345/173; 361/679.1
(58) Field of Classification Search .......... 345/156–178; 361/679.1, 679.18, 679.19, 679.27
See application file for complete search history.

(56) References Cited

U.S. PATENT DOCUMENTS

| | | | | |
|---|---|---|---|---|
| 5,990,872 | A * | 11/1999 | Jorgenson et al. | 345/168 |
| 6,266,050 | B1 * | 7/2001 | Oh et al. | 345/173 |
| 6,574,095 | B2 | 6/2003 | Suzuki | |
| 7,154,482 | B2 | 12/2006 | Kojo et al. | |
| 2002/0180704 | A1 * | 12/2002 | Rudd | 345/168 |
| 2003/0107557 | A1 * | 6/2003 | Liebenow et al. | 345/173 |
| 2005/0057489 | A1 * | 3/2005 | Kung et al. | 345/156 |
| 2007/0070048 | A1 | 3/2007 | Aoyagi | |

FOREIGN PATENT DOCUMENTS

| | | |
|---|---|---|
| JP | 9-044293 | 2/1997 |
| JP | 10-133796 | 5/1998 |
| JP | 2005-108036 | 4/2005 |
| JP | 2007-094808 | 4/2007 |

OTHER PUBLICATIONS

Japanese Patent Application No. 2008-171203, Notice of Reasons for Rejection, mailed Jun. 29, 2010. (English Translation).
Japanese Patent Application No. 2008-171203, Notice of Reasons for Rejection, mailed Sep. 21, 2010. (English Translation).

* cited by examiner

*Primary Examiner* — Stephen G Sherman
(74) *Attorney, Agent, or Firm* — Blakely, Sokoloff, Taylor & Zafman LLP (57) ABSTRACT

According to one embodiment, an electronic apparatus includes a coordinate input device which inputs coordinate data, a disabling range setting module which sets a disabling range in which the coordinate data, which is input by the coordinate input device, is disabled, a determination module which determines whether the coordinate data, which is input by the coordinate input device, is included in the disabling range which is set by the disabling range setting module, and a process module which executes a process corresponding to the coordinate data, which is input by the coordinate input device, in accordance with a determination result of the determination module.

6 Claims, 9 Drawing Sheets

```
Touch pad setting

Key input-associated control    ○ Execution
                                ● Non-execution Touch pad disabling range       ○ Entire touch pad
                                ● Part of touch pad
                                  [ Range setting ]

○ Touched part non-associated
                                  with input operation
                                  [ Range setting ]

[ OK ]  [ Cancel ]
```

Disabling range          Disabling range

ELECTRONIC APPARATUS

CROSS-REFERENCE TO RELATED APPLICATIONS

This application is based upon and claims the benefit of priority from Japanese Patent Application No. 2008-171203, filed Jun. 30, 2008, the entire contents of which are incorporated herein by reference.

BACKGROUND

1. Field

One embodiment of the present invention relates to an electronic device which is provided with a coordinate input device such as a touch pad.

2. Description of the Related Art

In general, in a notebook personal computer, a touch pad functioning as a coordinate input device is provided on the top surface of the body casing as a pointing device. In usual cases, the touch pad is disposed at a substantially central part on the front side of the keyboard. The enhancement in usability of the touch pad can be expected by increasing the area of the touch pad. However, the size of the touch pad is limited so as not to interfere with the key input. Specifically, if the area of the touch pad is increased, it is highly possible that the hand unintentionally comes in contact with the touch pad when key input is executed on the keyboard. In this case, a process, which is not intended by user, is executed in accordance with the input from the touch pad, leading to degradation in operability. For example, if the hand comes in contact with the touch pad during key input while a word processing operation is being performed by using the keyboard, the pointer (mouse cursor) on the screen shifts and the character input position moves.

In conventional personal computers, in order to cope with a problem occurring when the hand unintentionally comes in contact with the touch pad, the input from the touch pad is disabled, for example, during the key input. Thereby, even if the hand unintentionally comes in contact with the touch pad, unintentional movement of the cursor during the key input is prevented (see, e.g. Jpn. Pat. Appln. KOKAI Publication No. H10-133796).

As described above, in the conventional personal computer, the entire touch pad is disabled during the key input. Thereby, even if the hand comes in contact with the touch pad during the key input, a process, which is not intended by the user, is prevented from being executed.

However, in the control on the touch pad in the prior art, since the entire touch pad is disabled during the key input, the user cannot intentionally use the pointing function while performing the key input. For example, during the key input, operations using the touch pad, such as clicking, double-clicking and drag-and-drop, cannot be executed, and the operations using the touch pad cannot effectively be utilized.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an electronic apparatus comprising, a coordinate input device which inputs coordinate data; a disabling range setting module which sets a disabling range in which the coordinate data, which is input by the coordinate input device, is disabled; a determination module which determines whether the coordinate data, which is input by the coordinate input device, is included in the disabling range which is set by the disabling range setting module; and a process module which executes a process corresponding to the coordinate data, which is input by the coordinate input device, in accordance with a determination result of the determination module.

An embodiment of the present invention will now be described with reference to the accompanying drawings.

Figure 1:
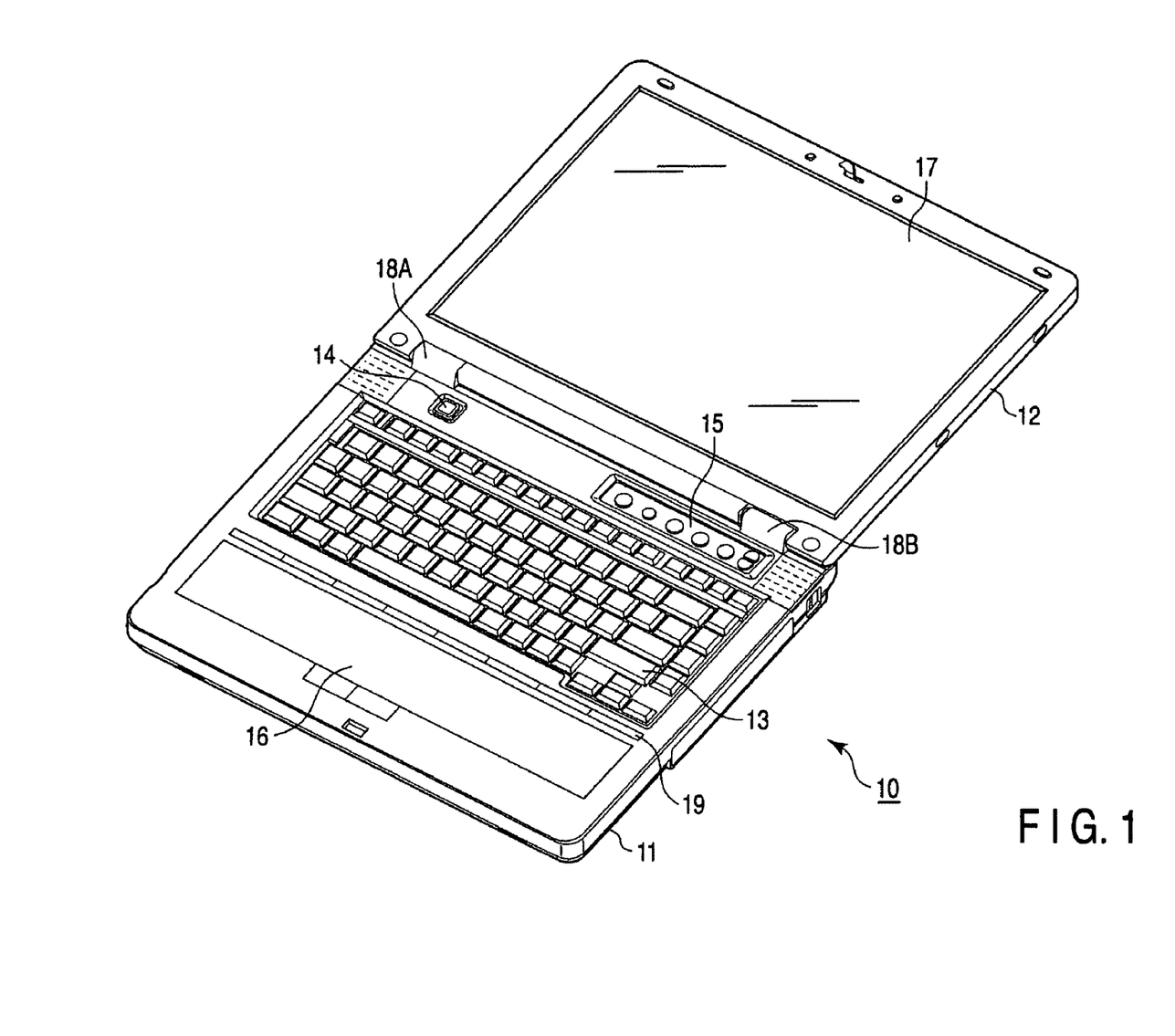
FIG. 1 is an exemplary perspective view showing the state in which a display unit of a personal computer according to an embodiment of the present invention is opened.
Figure 3:
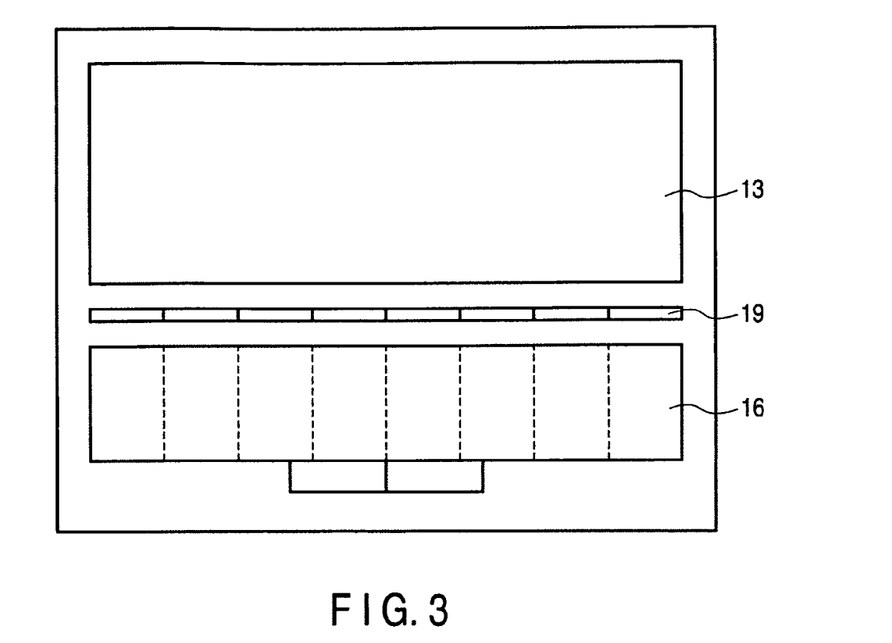
FIG. 3 is an exemplary plan view showing the top surface of the computer main body in the embodiment.

To begin with, referring to FIG. 1 and FIG. 3, the structure of an electronic according to an embodiment of the invention is described. This electronic apparatus is realized, for example, as a battery-powerable notebook personal computer 10.

FIG. 1 is a perspective view that shows the state in which a display unit of the notebook personal computer 10 is opened. The computer (electronic apparatus) 10 comprises a computer main body (electronic apparatus main body) 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position via hinges 18A and 18B.

The computer main body 11 has a thin box-shaped casing. A keyboard 13, a power button 14 for powering on/off the computer 10, an input operation panel 15, a touch pad 16, and a disabling range indicator 19 are disposed on the top surface of the computer main body 11. The input operation panel 15 is an input device for inputting an event corresponding to a pressed button switch. The input operation panel 15 includes a plurality of button switches for activating a plurality of functions.

In the personal computer 10 of the present embodiment, the touch pad 16 is provided on the front side of the keyboard 13 on the top surface of the computer main body 11, that is, on an area called "palm rest". The touch pad 16 is a pointing device which is, in usual cases, touched by the fingertip of a user, thereby inputting coordinate data. In the example shown in FIG. 1, the touch pad 16 is formed to have substantially the same width size as the top surface of the computer main body 11.

In FIG. 1, the touch pad 16 has substantially the same width size as the top surface of the computer main body 11. However, the touch pad 16 may be formed with an arbitrary size and may be disposed at an arbitrary position, regardless of, e.g. the home position of the keyboard 13. For example, the touch pad 16 may be formed with a size in a range including positions of the hands at the time when the user puts the hands on the home position of the keyboard 13. In the personal computer 10 of the present embodiment, even if the touch pad 16 is disposed on the position where the user puts the hands at the time of key input, it is possible to set a disabling range which disables coordinate data that is input in the range where the hands are placed. Thus, even if the hands are placed on the palm rest (touch pad 16) at the time of key input, it is possible to prevent the input of coordinate data which is not intended by the user.

For example, since the personal computer 10 of this embodiment has a small size, the area of the top surface of the computer main body 11 is narrow, and there may be a case in which the touch pad 16 cannot be disposed away from the position where the hands are placed, for reasons of the design of the personal computer 10. Even in such a case, it is possible to provide the touch pad 16 having such a size as to secure good operability.

The disabling range indicator 19 is an elongated display device which is disposed in the lateral width direction of the touch pad 16. In the case where a disabling range is set on the touch pad 16, the disabling range indicator 19 effects display for indicating the disabling range to the user. The details will be described later (see FIG. 3 and FIG. 4).

Figure 2:
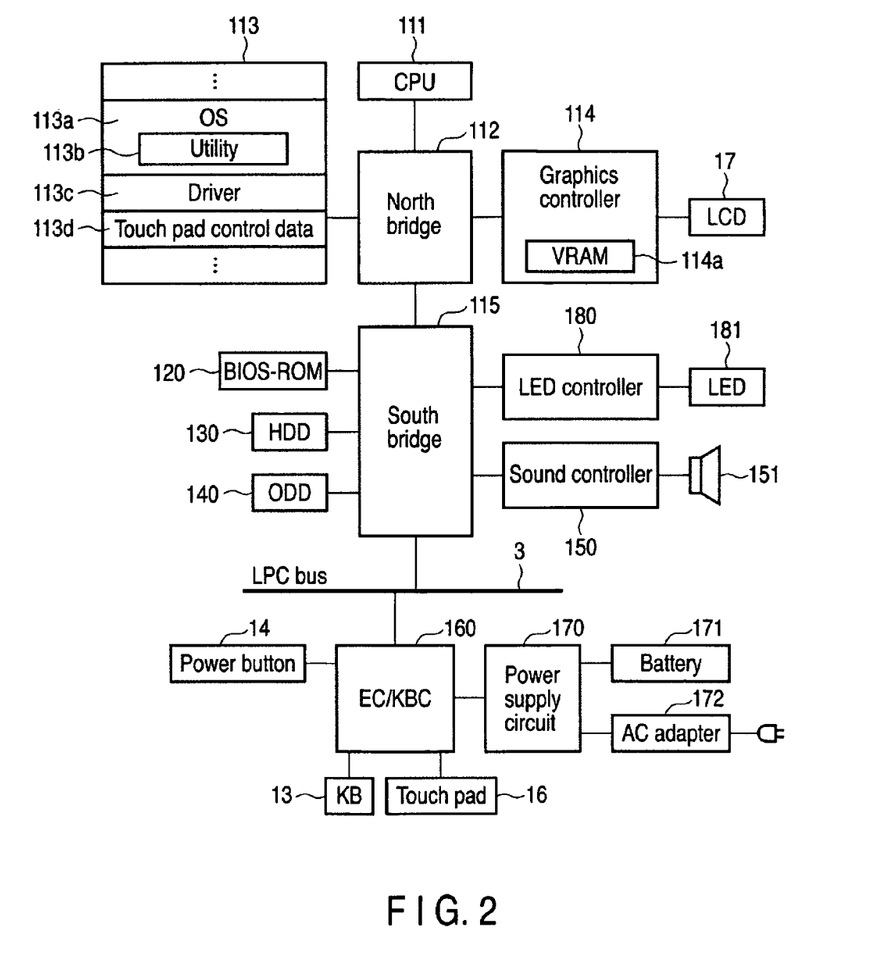
FIG. 2 is an exemplary block diagram showing the system configuration of a computer main body in the embodiment.

FIG. 2 is a block diagram showing the system configuration of the computer main body 11. The computer main body 11 includes a CPU 111, a north bridge 112, a main memory 113, a graphics controller 114 and a south bridge 115. The computer main body 11 also includes a BIOS-ROM 120, a hard disk drive (HDD) 130, an optical disc drive (ODD) 140, a sound controller 150, an embedded controller/keyboard controller IC (EC/KBC) 160, a power supply circuit 170, and an LED controller 180.

The CPU 111 is a processor for controlling the operation of the computer 10. The CPU 111 executes an operating system (OS) 113a (including a utility 113b), which is loaded from a boot device, e.g. the HDD 130, into the main memory 113. In addition, the CPU 111 executes various application programs. Besides, the CPU 111 executes a system BIOS (Basic Input/Output System) that is stored in the BIOS-ROM 120. The system BIOS is a program for hardware control.

In the personal computer 10 of this embodiment, the utility 113b is prepared for input control on the touch pad 16. The CPU 111 executes the utility 113b, thereby setting touch pad control data 113d for controlling the input of the touch pad 16. The touch pad control data 113d includes, for instance, data relating to settings as to whether the disabling range, which is set for the touch pad 16, is to be associated with the key input to the keyboard 13, and as to whether the disabling range of the touch pad 16 is to be set on the entire touch pad 16, a part of the touch pad 16, or a touched part which is non-associated with an input operation. The CPU 111 executes a driver 113c, thereby executing input control on the touch pad 16 in accordance with the touch pad control data 113d.

The north bridge 112 is a bridge device that connects a local bus of the CPU 111 and the south bridge 115. The north bridge 112 includes a memory controller that access-controls the main memory 113. The north bridge 112 also has a function of executing communication with the graphics controller 114 via, e.g. an AGP (Accelerated Graphics Port) bus.

The graphics controller 114 is a display controller which controls the LCD 17 that is used as a display monitor of the computer 10. The graphics controller 114 includes a video memory (VRAM) 114a, and generates a video signal, which forms a display image that is to be displayed on the LCD 17, on the basis of display data that is written in the video memory 114A.

The south bridge 115 controls access to the BIOS-ROM 120. The BIOS-ROM 120 is a rewritable nonvolatile memory such as a flash ROM. As described above, the BIOS-ROM 120 stores the system BIOS. In addition, the south bridge 115 controls disc drives (I/O devices) such as the HDD 130 and ODD 140.

The south bridge 115 controls various devices on an LPC bus 3.

The HDD 130 is a storage device which stores various programs and data. In the HDD 130, data write/read is executed on a magnetic disk which is rotated by a motor. The HDD 130 prestores programs such as the operating system (OS) and drivers. The OS is loaded in the main memory 113 according to the system BIOS that is stored in the BIOS-ROM 120, and is executed by the CPU 111. Other programs and data are loaded in the main memory 113, where necessary, and are executed by the CPU 111.

The ODD 140 is a drive unit which rotates and drives optical discs, such as a compact disc (CD) and a digital versatile disc (DVD), by means of a motor. The ODD 140 executes data read/write on optical discs.

The sound controller 150 executes control to produce sound from a speaker 151. For example, the sound controller 150 produces sound from the speaker 151 in accordance with input control on the touch pad 16.

The EC/KBC 160 is a 1-chip microcomputer in which an embedded controller for power management and a keyboard controller for controlling the keyboard (KB) 13 and touch pad 16 are integrated. The EC/KBC 160 has a power control function of cooperating with the power supply circuit 170, thereby powering on the computer 10 in response to the user's operation of the power button 14.

The power supply circuit 170 uses DC power which is supplied from a rechargeable battery 171 or from an AC adapter 172 functioning as a high voltage power supply, thereby generating system power supply voltages which are to be applied to the respective components of the computer main body 11. The AC adapter 172 converts AC power to DC power.

The LED controller 180 controls lighting (flickering) of a plurality of LEDs 181 which are used in the disabling range indicator 19. Specifically, the LED controller 180 turns on (flickers) the LEDs 181 corresponding to the disabling range that is set on the touch pad 16, thereby causing the user to recognize the part that has been set as the disabling range.

FIG. 3 is a plan view showing the top surface of the computer main body 11.

As shown in FIG. 3, the keyboard 13 is disposed on the computer main body 11. The touch pad 16 is disposed on the front side (user side) of the keyboard 13. The touch pad 16 is formed to have substantially the same lateral width as the computer main body 11 (i.e. the touch pad 16 is formed over the entire palm rest). The disabling range indicator 19 is disposed between the keyboard 13 and the touch pad 16 along the lateral width of the touch pad 16. The touch pad 16 may be provided over the entire palm rest, as shown in FIG. 1 and FIG. 3, or may be formed with an arbitrary width size, e.g. ¾ of the lateral width or ⅔ of the lateral width.

Figure 4:
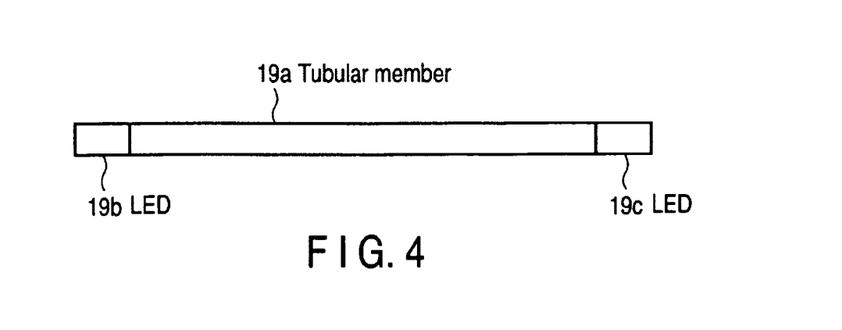
FIG. 4 is an exemplary view showing a disabling range indicator in the embodiment.

The disabling range indicator 19 is configured to include a plurality of tubular members 19a, as shown in FIG. 4, which are linearly arranged. The disabling range indicator 19 is embedded to be flush with the top surface of the casing of the computer main body 11. The coordinate input surface of the touch pad 16 are virtually divided into a plurality of small areas. FIG. 3 indicates, by broken lines, the division of the small areas which are arranged in the lateral direction. The plural tubular members 19a are disposed in association with the respective small areas.

FIG. 4 schematically shows the structure of one of the tubular members 19a which constitute the disabling range indicator 19.

The tubular member 19a is a tubular light-transmissive member. LEDs 19b and 19c (LED 181) are embedded at both ends of the tubular member 19a. When the LEDs 19b and 19c are turned on, light is emitted from both ends of the tubular member 19a, and the entirety of the tubular member 19a is lighted. In the meantime, the LED 19b, 19c may be configured to selectively emit lights of a plurality of different colors, so that the display color of the tubular member 19a may be changed according to conditions.

In the disabling range indicator 19, the LEDs 19b and 19c of the tubular member 19a corresponding to the enabled range (i.e. the range that is not set as the disabling range) of the touch pad 16 are turned on (or flickered). Thereby, the area on the touch pad 16, where coordinate data input is enabled, is visually indicated to the user. Alternatively, in the disabling range indicator 19, the tubular member 19a corresponding to the disabling range may be turned on (or flickered).

In the structure shown in FIG. 3, the disabling range indicator 19 is composed by embedding the plural tubular members 19a in the casing. Alternatively, the casing itself may be formed of a light-transmissive member, so that the casing itself may effect display by LEDs. For example, like the disabling range indicator 19 shown in FIG. 3, LEDs are embedded in the casing, which is formed of a light-transmissive member, at positions associated with a plurality of small areas of the touch pad 16. Alternatively, LEDs may be disposed under the casing. Each LED is turned on (flickered) in accordance with the enabling/disabling range which is set on the touch pad 16. Thereby, the same function as the disabling range indicator 19 can be performed.

Figure 5:
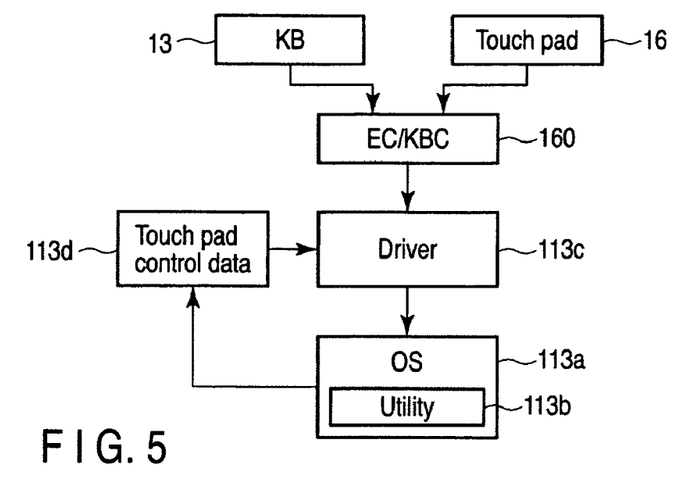
FIG. 5 is an exemplary structural diagram relating to input control of a touch pad in the personal computer of the embodiment.

FIG. 5 is a structural diagram relating to the input control of the touch pad 16 in the personal computer 10 in the embodiment.

The EC/KBC 160 controls the inputs from the keyboard 13 and the touch pad 16. The driver 113c executes control of enabling/disabling in accordance with the touch pad control data 113d, which is set in advance by the utility 113b, with respect to the coordinate data which is input from the touch pad 16 via the EC/KBC 160. The driver 113c outputs coordinate data in a range, which is not set in the disabling range on the touch pad 16, as enabled input coordinate data to the OS 113a. In addition, the driver 113c is informed of the key input on the keyboard 13 from the EC/KBC 160, thus being able to execute input control on the touch pad 16 in association with the key input.

In the personal computer 10 in the present embodiment, the CPU 111 executes the utility 113b, thereby setting the touch pad control data 113d, and being able to execute the following control on the touch pad 16.

(A) First method (a case in which touch pad control is executed in association with key input)

(A1) The entire touch pad is disabled.

(A2) The touch pad is equally divided into small areas, and a part of the small areas is disabled.

(A3) Only a touched part, which is not associated with an input operation, is disabled.

(B) Second method (a case in which touch pad control is executed not in association with key input)

(B1) The entire touch pad is disabled.

(B2) The touch pad is equally divided into small areas, and a part of the small areas is disabled.

(B3) Only a touched part is disabled.

Next, the control operation of the touch pad 16 of the personal computer 10 according to the present embodiment is described.

Figure 6:
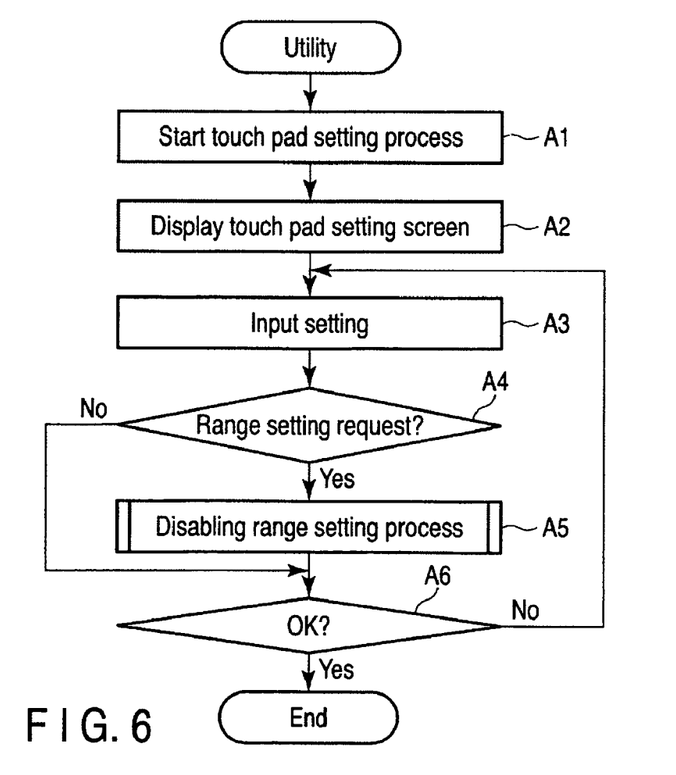
FIG. 6 is an exemplary flow chart illustrating a setting operation of touch pad control data by a utility in the embodiment.

To begin with, referring to a flow chart of FIG. 6, a description is given of a setting operation of touch pad control data 113d by the execution of the utility 113b by the CPU 11.

If a touch pad setting process is requested by a user operation, the utility 113b starts a tablet setting process (block A1), and causes the LCD 17 to display a touch pad setting screen (block A2).

Figure 7:
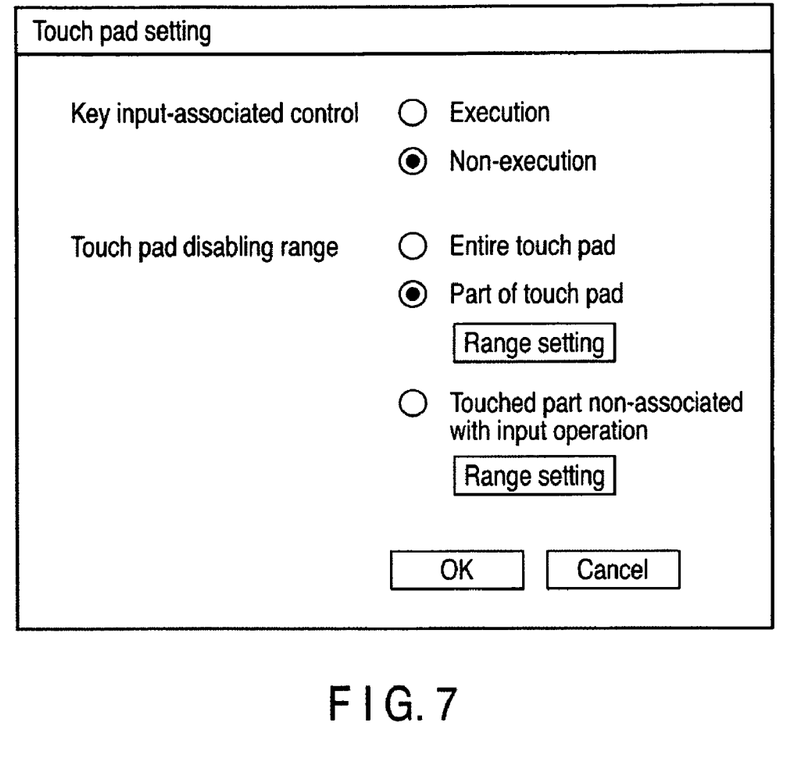
FIG. 7 is an exemplary view showing a touch pad setting screen in the embodiment.

FIG. 7 shows an example of the touch pad setting screen. On the touch pad setting screen, either "execution" or "non-execution" of key input-associated control can arbitrarily be selected. FIG. 7 shows the state in which the "non-execution" of the key input-associated control is selected.

In addition, on the touch pad setting screen, one of "entire touch pad", "part of touch pad" and "touched part non-associated with input operation" can be selected as a touch pad disabling range. If "entire touch pad" or "touched part non-associated with input operation" is selected as the touch pad disabling range, the range of disabling can be set in accordance with an instruction from the user.

The utility 113b accepts the input by the user through the touch pad setting screen shown in FIG. 7, and sets the key input-associated control or the touch pad disabling range (block A3).

If "part of touch pad" or "touched part non-associated with input operation" is selected as the touch pad disabling range and execution of "range setting" is requested (Yes in block A4), the utility 113b executes a disabling range setting process (block A5). If an "OK" button is selected after the completion of settings including the disabling range setting process, the utility 113b creates the touch pad control data 113d in accordance with the setting content that is set on the setting screen.

Next, a concrete example of the disabling range setting process is described.

To begin with, a description is given of the disabling range setting process in a case where "part of touch pad" is selected as the touch pad disabling range.

Figure 8:
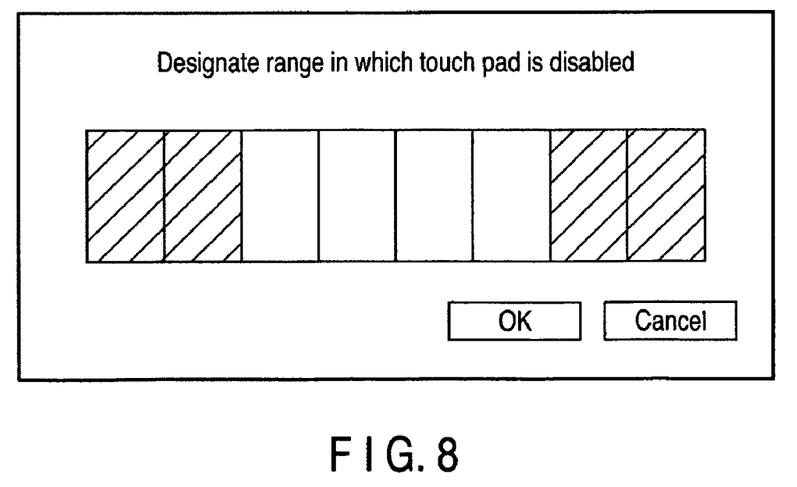
FIG. 8 is an example of a view showing a setting screen of a disabling range setting process in the embodiment.

The utility 113b starts the disabling range setting process for setting the "part of touch pad" as the disabling range, and displays a setting screen as shown in FIG. 8. The setting screen shown in FIG. 8 displays a figure corresponding to the touch pad 16, and also displays a message "designate the range in which the touch pad is disabled". The figure corresponding to the touch pad 16 indicates the division of preset small areas of the touch pad 16. In the example shown in FIG. 8, the area (coordinate input surface) of the touch pad 16 is equally divided into eight areas. As regards this figure, some of the small areas can arbitrarily be selected as the disabling range, for example, by operating the keyboard 13 or touch pad 16. FIG. 8 shows the state in which four small areas at both ends are selected as the disabling range. For example, in the case where the user does not perform an input operation on both end sides of the touch pad 16, or in the case where the hands are placed, in many cases, on both end positions of the touch pad 16 at the time of performing the key input operation, the disabling range can be set as shown in FIG. 8. Thereby, the user can prevent unintentional input of coordinate data from the touch pad 16.

If the "OK" button is selected, the utility 113b sets the small areas, which are selected in the setting screen, as the disabling range in the touch pad control data 113d.

Figure 9A:
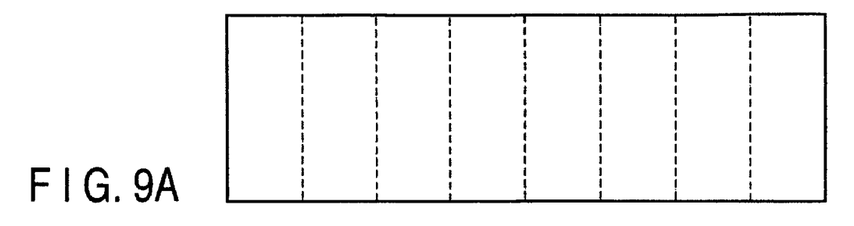
FIG. 9A and FIG. 9B are exemplary views showing a range in which input of coordinate data on the touch pad is enabled in the present embodiment.
Figure 9B:
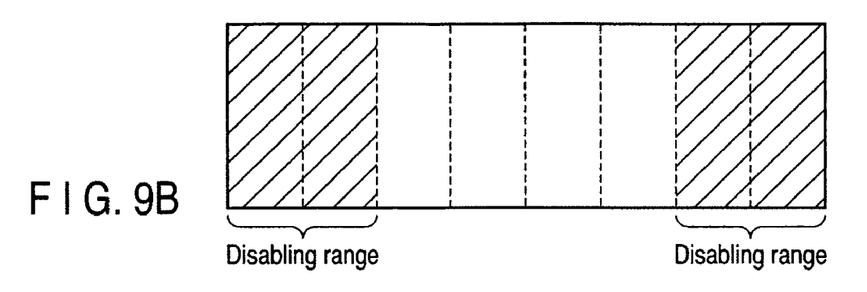

FIG. 9A and FIG. 9B show examples of the ranges in which coordinate data input to the touch pad 16 is enabled. In the case where no disabling range is set, as shown in FIG. 9A, coordinate data input is enabled in the entire area of the touch pad 16. On the other hand, in the case where the disabling range is set, as shown in FIG. 8, both end side parts of the touch pad 16 are controlled as the disabling range, as shown in FIG. 9B. Thus, for example, even if key input is executed while the hands are being placed on both end side positions of the touch pad 16, unintentional input of coordinate data is not executed from the touch pad 16.

The settings of the disabling range in FIG. 8 and FIG. 9B are merely examples. An arbitrary number of small areas at arbitrary positions can be set as a disabling range, in accordance with, e.g. the method of use of the touch pad 16 by the user and the position of the hands on the palm rest at the time of executing key input on the keyboard 13.

On the setting screen shown in FIG. 8, selection is made from pre-divided small areas. Alternatively, the position of division of the disabling range may continuously be designated without division into the small areas. In FIG. 8, the area of the laterally elongated touch pad 16 is equally divided into small areas in the horizontal direction, but the area may be divided into small areas in the vertical direction, or the divided small areas may have different sizes at both end part and at the central part of the touch pad 16.

Figure 10:
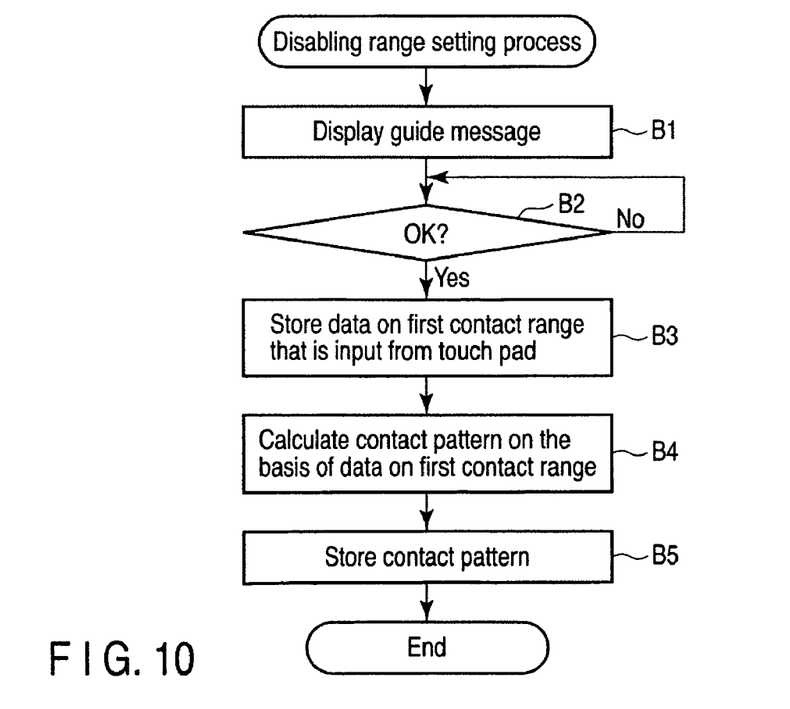
FIG. 10 is an exemplary flow chart illustrating the disabling range setting process in the embodiment.

Next, a description is given of the disabling range setting process in the case where the "touched part non-associated with input operation" is selected as the touch pad disabling range. FIG. 10 is a flow chart of the disabling range setting process.

The disabling range setting process is a process for recording data which becomes a reference for determining whether coordinate data, which is input from the touch pad 1, has been input by a normal input operation or has been input unintentionally by the user, that is, a process for recording a contact pattern. The contact pattern is data which becomes a reference for determining coordinate data which is input by a normal input operation on the touch pad 16. In the present embodiment, when coordinate data has been input on an area having a larger size than the contact pattern, the area in which the coordinate data has been input is set as a disabling range by determining that the data that is input on this area is not coordinate data that is input by a normal input operation.

Figure 11:
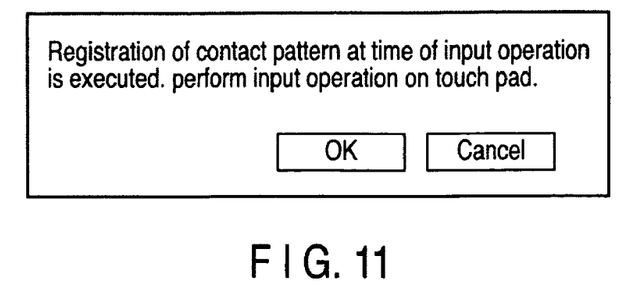
FIG. 11 is an exemplary view showing a display example in the disabling range setting process in the embodiment.

To start with, the utility 113b starts the disabling range setting process for setting the "touched part non-associated with input operation" as the disabling range, and displays a guide message as shown in FIG. 11 (block B1). The displayed guide message reads: "Registration of a contact pattern at a time of an input operation is executed. Execute an input operation on the touch pad." The user is prompted to execute a normal input operation on the touch pad 16, for example, an input operation for moving the pointer (mouse cursor) which is displayed on the screen.

If the "OK" button is selected on the guide message screen (Yes in block B2), the utility 113b transitions to a wait state for the input from the touch pad 16.

If the input operation is executed on the touch pad 16 by the user, the first coordinate data of the contact range, which is input from the touch pad 16, is input via the EC/KBC 160 and driver 113c. The coordinate data, which is input in this case, is not data which is indicative of one point, but is a coordinate data group representing the range of contact with the finger. The utility 113b temporarily stores the input coordinate data group in the main memory 113 (block B3). The utility 113b calculates a contact pattern on the basis of the data of the first coordinate data of the contact range (block B4), and stores the data, which represents the contact pattern, as the touch pad control data 113d (block B5).

Figure 12A:
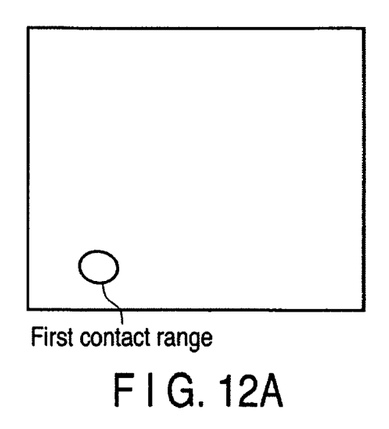
FIG. 12A and FIG. 12B are exemplary views showing coordinate data (contact range) which is input in order to register a contact pattern in the embodiment.
Figure 12B:
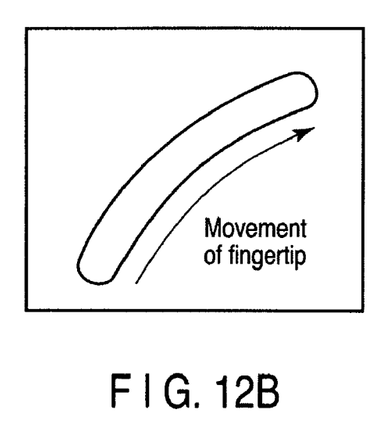

FIG. 12A and FIG. 12B show examples of coordinate data groups (contact ranges) which are input in order to register contact patterns.

For example, in the input operation for moving the pointer, the fingertip is first put in contact with the touch pad 16, and then the fingertip is moved over the touch pad 16 in accordance with the direction of the movement of the pointer. In this case, after the input of the coordinate data group of the first contact range at the time when the fingertip is put in contact with the touch pad 16, as shown in FIG. 12A, the coordinate data group corresponding to the movement of the fingertip is input, as shown in FIG. 12B.

Figure 13:
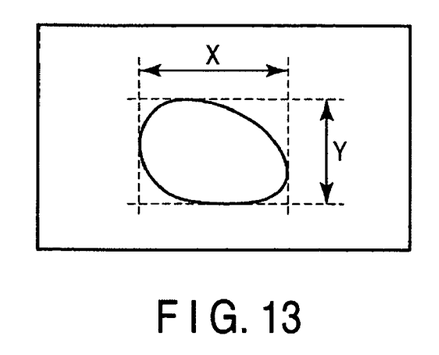
FIG. 13 is an exemplary view for explaining calculation of a contact pattern in the embodiment.

FIG. 13 shows the first contact range shown in FIG. 12A. On the basis of the first contact range, the utility 113b calculates, for example, the size X in the horizontal direction and the size Y in the vertical direction. The size, which is obtained by multiplying the size XY of the contact range by a preset predetermined magnification, is calculated as the contact pattern. For example, the contact pattern is calculated by multiplying the size XY of the contact range by 1.2. By slightly increasing the size XY of the contact range, it is possible to prevent the coordinate data, which is input from the touch pad 16 by the actual input operation, from being determined to be "disabled", even if the first contact range slightly varies from input operation to input operation.

Figure 14:
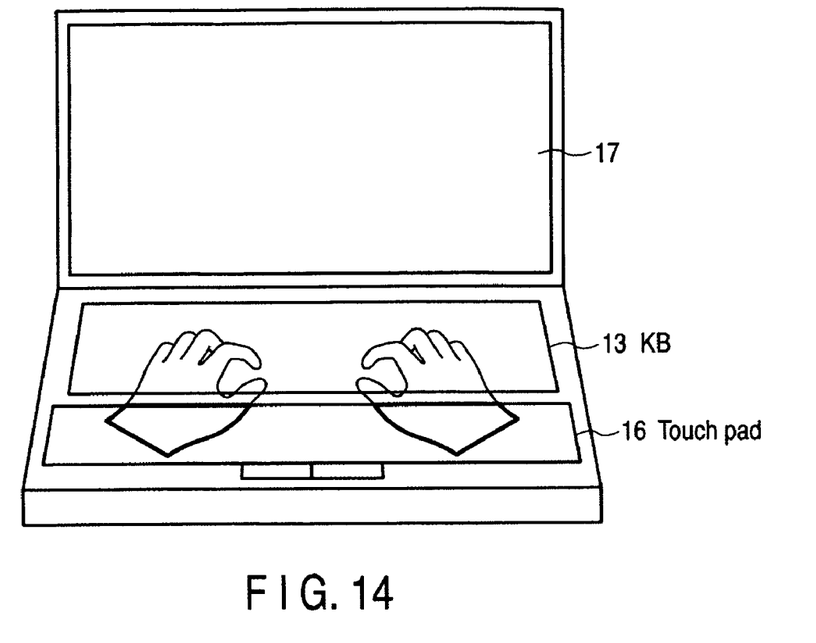
FIG. 14 is an exemplary view showing the positions of the hands in a case of executing key input on a keyboard in the embodiment.

FIG. 14 is a view showing the positions of the hands in a case of executing key input on the keyboard 13. Normally, when key input is executed on the keyboard 13, the user, in many cases, puts the hands on the front side of the keyboard 13 in accordance with the home position. In the personal computer 10 of the present embodiment, the touch pad 16 is provided over the entire width in the lateral direction, and thus the hands are placed on the touch pad 16.

In this case, the hands are in contact with the touch pads 16 over a wider range than in the case of performing an ordinary input operation on the touch pad 16 with use of the fingertip.

The contact pattern is calculated on the basis of the input data at the time of an ordinary input operation. Thus, the data that is input from the region of the touch pad, where the hands are placed as shown in FIG. 14, can be determined to be "disabled data", on the basis of the comparison with the contact pattern.

Figure 15:
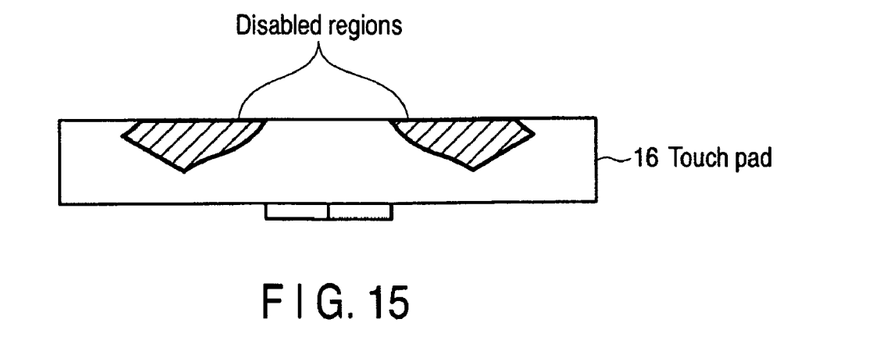
FIG. 15 is an exemplary view showing a disabling range which is set in accordance with the positions of the hands in the embodiment.

FIG. 15 shows an example of the disabling range, which is set in the case where the hands are placed as shown in FIG. 14.

In the above description, the contact pattern is registered on the basis of the data that is input by a single input operation. Alternatively, the contact pattern may be calculated on the basis of the data that is input by a plurality of input operations. For example, an average value of data, which is input by a plurality of input operations, may be calculated, and the contact pattern may be calculated on the basis of the data of the average value.

As has been described above, since the contact pattern is calculated on the basis of the coordinate data that is input when the user actually performs the input operation on the touch pad 16, proper contact patterns for individual users can be registered. Therefore, by using the contact pattern as the reference for determination, an enabled input and a disabled input on the touch pad 16 can exactly be determined.

Figure 16:
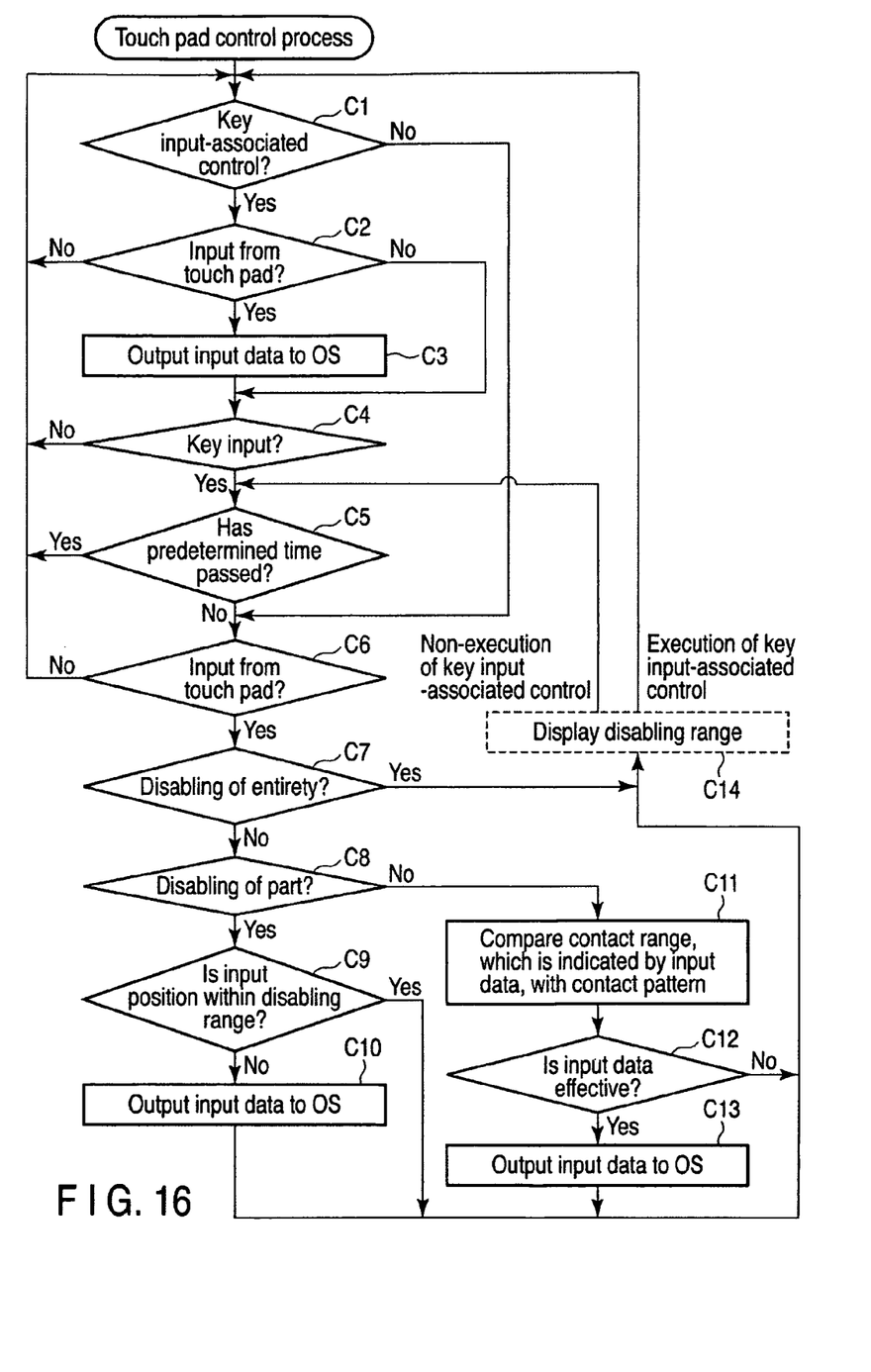
FIG. 16 is an exemplary flow chart illustrating a touch pad control process by a driver in the embodiment.

Next, the touch pad control process by the driver 113*c* is described with reference to a flow chart of FIG. 16. The driver 113*c* executes control of input from the touch pad 16 in accordance with the touch pad control data 113*d* which is set by the utility 113*b*.

To begin with, a description is given of the case in which "non-execution" of the key input-associated control is set in the touch pad control data 113*d*.

In the case where the key input-associated control is not executed (No in block C1), if the driver 113*c* accepts an input from the touch pad 16 via the EC/KBC 160 (Yes in block C6), the driver 113*c* determines whether the input coordinate data is disabled or enabled, in accordance with the setting of the touch pad disabling range.

If the "entire touch pad" is set to be the disabling range (Yes in block C7), the driver 113*c* disables the input coordinate data. Specifically, the driver 113*c* does not output the input data from the touch pad 16 to the OS 113*a*.

The driver 113*c* controls display by the disabling range indicator 19 in accordance with the disabling range which is set in the touch pad control data 113*d* (block C14). The driver 113*c* causes the LED controller 180 to turn on the LEDs 19*b* and 19*c* of the tubular members 19*a* which correspond to the range that is not set as the disabling range, that is, the enabled range. In this case, since all areas are disabled, display by the disabling range indicator 19 is not executed.

In the case where the user does not use the touch pad 16, the user sets the entire touch pad 16 to be the disabling range, without execution of the key input-associated control. Thereby, unintentional input on the touch pad 16 can be prevented.

Next, in the case where the "part of the touch pad" is set as the disabling range (Yes in block C8), the driver 113*c* determines whether the input coordinate data is included in the disabling range or not. In the case where the input coordinate data is included in the disabling range, the input coordinate data is disabled and is not output to the OS 113*a*. The driver 113*c* effects display by the tubular members 19*a* which correspond to the range that is not set as the disabling range in the touch pad control data 113*d*, that is, the enabled range (block C14).

On the other hand, if the input coordinate data is not included in the disabling range, the driver 113*c* enables the input coordinate data and outputs it to the OS 113*a* (block C10). Specifically, since the input coordinate data is the data which is input at a position in the range that is not set as the disabling range, this coordinate data is determined to be the coordinate data that is intentionally input by the user, and is output to the OS 113*a*. The OS 113*a* executes a process corresponding to the input coordinate data. For example, the OS 113*a* executes a process of moving the position of the pointer on the screen, or causes an application program to execute a process corresponding to the input coordinate data.

Next, in the case where the "touched part non-associated with input operation" is set as the disabling range (No in block C8), the driver 113*c* compares the contact range, which is indicated by the input data (coordinate data group), with the contact pattern which is set in the touch pad control data 113*d* (block C11). In the case where the size of the contact range is broader than the contact pattern, the driver 113*c* determines that the input data is disabled (No in block 12). For example, if the region of contact is broader than the area of contact, on which input is executed by a normal input operation, as shown in FIG. 14, the input on this region is disabled.

On the other hand, in the case where the size of the contact range is not broader than the contract pattern, the driver 113*c* determines that the input data is enabled (Yes in block C12). Specifically, the driver 113*c* determines that the input data is the coordinate data that is input by a normal input operation and outputs the input coordinate data to the OS 113*a* (block C13).

In the case where an input with a contact range whose size is not broader than the contact pattern and an input with a contact range whose size is broader than the contact pattern are performed at the same time, the driver 113*c* determines enabling/disabling with respect to each of the input contact ranges. For example, there is a case in which while one hand is being placed on the touch pad 16, a normal input operation is performed by using the other hand by making use of a free area on the touch pad 16. In this case, the data that is input by the hand that is placed on the touch pad 16 is determined to be "disabled", and the data that is input by the normal input operation is determined to be "enabled".

As has been described above, when the key input-associated control is not executed, the enabling/disabling of the coordinate data, which is input from the touch pad 16, is determined in accordance with the disabling range which is set by using the utility 113*b* in advance. Only the data that is determined to be "enabled" is output to the OS 113*a*. Accordingly, if the user performs, in advance, the presetting relating to the method of use of the touch pad 16, the user can execute only intentional input on the touch pad 16, regardless of the key input on the keyboard 13. Therefore, the touch pad 16 can effectively be used, and the operability can be improved.

Next, a description is given of the case in which the "execution" of the key input-associated control is set in the touch pad control data 113*d*.

In the case where the key input-associated control is executed (Yes in block C1), if the driver 113*c* accepts an input from the touch pad 16 via the EC/KBC 160 (Yes in block C2), the driver 113*c* outputs the input coordinate data to the OS 113*a* (block C3). Specifically, if key input on the keyboard 13 is not executed, a disabling range is not set on the touch pad 16, and thus coordinate data, which is input anywhere in the range of the touch pad 16, is enabled. The user can execute processes with high operability by effectively using the touch pad 16 having a wide area.

On the other hand, if key input is executed on the keyboard 13, the driver 113*c* is informed of the key input via the EC/KBC 160 (Yes in block C4). The driver 113*c* starts measurement of time from the key input operation. Specifically, although the disabling range is set on the touch pad 16 in accordance with the key input, this disabling range is effective only during a preset time period. For example, the disabling range is made effective during one second from the key input. If the key input operation is successively performed, the time from the last key input is the preset time period.

If a predetermined time period has not passed (No in block C5), the driver 113c executes the same process as in the above-described blocks C7 to C14 with respect to the input to the touch pad 16. Specifically, the driver 113c controls the input from the touch pad 16 in accordance with the setting content in the touch pad control data 113d.

If the predetermined time period has passed (Yes in block C5), the driver 113c cancels the disabling range on the touch pad 16, and enables coordinate data which is input anywhere in the range of the touch pad 16 (blocks C1 to C4).

In the above description, the time for maintaining the disabling range is a preset time of, e.g. one second. Alternatively, the user may arbitrarily set the time in the touch pad setting process by the utility 113b. This realizes the input control that is associated with the key input on the touch pad 16 in accordance with the operation method of each user.

In addition, the time for maintaining the disabling range may be varied in accordance with the difference in position on the touch pad 16. For example, in the vicinity of the home position of the keyboard 13, the user's hands are frequently placed and the time in which the hands are placed is long. Accordingly, the time for maintaining the disabling range is made longer than in the other areas. Conversely, in areas where the user's hands are not frequently placed, the time for maintaining the disabling range is made shorter, thereby enabling input immediately after the key input. For example, an operation, which is frequently performed in combination with a key input operation, such as an operation of scrolling the screen, can be performed by using the touch pad 16.

Besides, the time for maintaining the disabling range for each of the individual areas may be set in the touch pad setting process by the utility 113b.

Furthermore, in accordance with the elapsed time from the key input, the display color of the LEDs 19b and 19c of the disabling range indicator 19 may be altered, or the display mode (e.g. lighting, flickering) of the LEDs 19b and 19c may be varied. Thereby, the user can be made to recognize the time at which the input on the range of the touch pad 16, which has been set as the disabling range, will be enabled, or the user can be informed that the input has just been enabled.

As has been described above, in the case where the key input-associated control is executed, the enabling/disabling of the coordinate data, which is input from the touch pad 16, can be controlled in accordance with the disabling range that is preset by using the utility 113b, by executing the key input on the keyboard 13. Specifically, the user can selectively use the key input on the keyboard 13 and the input of coordinate data on the touch pad 16. Therefore, the touch pad 16 can effectively be used and the operability can be improved.

In the above description, the enabling/disabling range, which is set on the touch pad 16, is visually indicated to the user by the disabling range indicator 19. Alternatively, the enabling/disabling range can be auditorily indicated to the user.

For example, in the case where input is executed in the disabling range on the touch pad 16, the driver 113c causes the sound controller 150 to produce predetermined sound. Specifically, the driver 113c causes the sound controller 150 to produce sound in the cases of "Yes in block C7", "No in block C12" and "Yes in block C9" in which input coordinate data is disabled.

Different sounds may be produced between the case in which the input coordinate data is included in the disabling range and the case in which the input coordinate data is included in the enabled range. Besides, sound may be produced only in the case where coordinate data is input in the enabled range.

Thereby, the user can recognize the disabling range, which is set on the touch pad 16, by the sound that is produced in accordance with the input from the touch pad 16.

As has been described above, even in the case where the touch pad 16 is disposed at an arbitrary position, regardless of the position of the hands which are placed at the home position of the keyboard 13, the disabling range can be set by the user's designation. Thus, unintentional input on the touch pad 16 can be prevented, and coordinate data can be input on other areas of the touch pad 16. Therefore, even while the key input on the keyboard 13 is being executed, the user can intentionally perform input operations on the touch pad 16 in the enabled range, such as operations of clicking, double-clicking and drag-and-drop. In the personal computer 10 in this embodiment, the operability using the touch pad 16 can effectively be utilized.

In the above description, the disabling range indicator 19 is provided to enable the user to recognize the disabling range that is set on the touch pad 16. In place of the disabling range indicator 19, the LCD 17 may be caused to effect display so as to enable the user to recognize the disabling range. For example, when the disabling range is set on the touch pad 16, the utility 113b effects display of a figure corresponding to the width size of the touch panel 16. In the figure, a part corresponding to the disabling range, which is set on the touch pad 16, and a part, which corresponds to the enabled range, are displayed in different colors. Thereby, even if the structure of the disabling range indicator 19 is dispensed with, the enabled/disabling ranges on the touch pad 16 can easily be recognized.

The above description is directed to the structure examples which are realized in the personal computer 10. These structure examples, however, can also be realized in other electronic apparatuses which are equipped with touch pads (coordinate input devices).

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. An electronic apparatus comprising:
   a coordinate input device which inputs coordinate data, the coordinate input device including a coordinate input surface that is disposed on a front side of a keyboard provided on a top surface of a casing and has a size including at least part of a position of a hand when the hand is placed at a home position on the keyboard;

a range detection module which detects a range of contact of the hand with the coordinate input surface of the coordinate input device;

a setting module which sets a disabling range on the basis of the range detected by the range detection module, the disabling range being a range where the coordinate data input by the coordinate input device is disabled;

an elapsed time determination module which determines whether a preset time elapses from a time when the disabling range is set by the disabling range setting module;

a setting canceling module which cancels the setting of the disabling range in a case where the elapsed time determination module determines that the preset time has elapsed;

a determination module which determines whether the coordinate data, which is input by the coordinate input device, is included in the disabling range which is set by the disabling range setting module; and a process module which executes a process for disabling the coordinate data when the determination module determines that the coordinate data is included in the disabling range.

2. The electronic apparatus of claim 1, wherein the disabling range setting module sets the disabling range in association with key input on the keyboard, and the setting canceling module cancels the setting of the disabling range after a predetermined time has passed since the key input.

3. The electronic apparatus of claim 1, further comprising:

a range memory module which stores data on a contact range at a time of an input operation on the coordinate input device; and a contact pattern setting module which sets, on the basis of the data on the contact range that is stored in the range memory module, a contact pattern for determining contact/non-contact of the hand by the range detection module, wherein the range detection module determines the range of contact of the hand in a case where an input range on the coordinate input surface is broader than the contact pattern, and the setting module sets the disabling range on the basis of the range detected by the range detection module, in a case where the range detection module determines the range of contact of the hand.

4. The electronic apparatus of claim 1, further comprising a display module which effects display for indicating the disabling range which is set by the disabling range setting module.

5. The electronic apparatus of claim 1, further comprising a sound producing module which produces sound in accordance with the coordinate data that is input by the coordinate input device, on the basis of a determination result of the determination module.

6. The electronic apparatus of claim 1, wherein the elapsed time determined by the elapsed time determination module is set in accordance with a position on the coordinate input surface in the disabling range.

* * * * *